United States Patent [19]

Jagodnik, Jr. et al.

[11] Patent Number: 4,747,067

[45] Date of Patent: May 24, 1988

[54] APPARATUS AND METHOD FOR APPROXIMATING THE MAGNITUDE OF A COMPLEX NUMBER

[75] Inventors: Anthony J. Jagodnik, Jr., Bolton; Ronald C. Evett, Holliston, both of Mass.

[73] Assignee: Raytheon Company, Lexington, Mass.

[21] Appl. No.: 918,751

[22] Filed: Oct. 14, 1986

[51] Int. Cl.[4] .................................. G06F 7/38
[52] U.S. Cl. ................................ 364/715; 364/752
[58] Field of Search ............... 364/715, 752, 729, 814, 364/815, 817, 754, 757

[56] References Cited

U.S. PATENT DOCUMENTS

| | | | |
|---|---|---|---|
| 3,829,671 | 8/1974 | Gathright et al. | 364/752 |
| 3,858,036 | 12/1974 | Lunsford | 364/752 |
| 4,481,601 | 11/1984 | Heinle | 364/815 |
| 4,599,701 | 7/1986 | Vojir et al. | 364/752 |
| 4,692,889 | 9/1987 | McNeely | 364/730 |

OTHER PUBLICATIONS

"The CORDIC Trigonometric Computing Technique", by Volder, *IRE Transactions on Electronic Computers*, Sep., 1959, pp. 330–334.

"Magnitude Approximations for Microprocessor Implementation", by Adams et al., *IEEE MICRO*, Oct., 1983, pp. 27–31.

*Primary Examiner*—Gary V. Harkcom
*Assistant Examiner*—Tan V. Mai
*Attorney, Agent, or Firm*—Walter F. Dawson; Richard M. Sharkansky

[57] ABSTRACT

Vector magnitude approximating logic using logarithms of the vector's orthogonal components to select multiplier scaling constants and to minimize arithmetic-function and hardware complexity. The apparatus is particularly applicable to a high-throughput, pipelined, digital signal processing application such as radar. The vector magnitude is approximated by multiplying each component of a complex number representing the vector by selected scaling constants and then by summing the two resulting products. The scaling constants are selected by feeding each orthogonal component of the vector into one of two identical logic arrays which determine the base-2 logarithm of the absolute value of each component. The resulting logarithm values are fed, in parallel, into a third logic array which outputs an address to real and imaginary constant read-only memory generators for providing respective scaling constant pairs which are used to compute the approximate magnitude of the vector or complex number representing the vector.

39 Claims, 2 Drawing Sheets

APPARATUS AND METHOD FOR APPROXIMATING THE MAGNITUDE OF A COMPLEX NUMBER

This invention was made with Government support under Contract No. F30602-84-C-0094 awarded by the Department of the Air Force. The Government has rights in this invention.

BACKGROUND OF THE INVENTION

This invention relates to digital signal processing and in particular to an apparatus and method for approximating the magnitude of a complex number given its real and imaginary components.

Determining the magnitude of a complex number such as $X+jY$, which is a common calculation performed in radar signal processing applications, has been accomplished by at least three methods: the CORDIC computing technique, single interval linear approximation, and multiple interval piece-wise linear approximation.

The term CORDIC was originally defined as standing for COordinate Rotation DIgital Computer by Jack E. Volder in the September 1959 issue of IRE transactions on Electronic Computers in an article titled, "The CORDIC Trigonometric Computing Technique". The CORDIC computing technique was developed especially for use in a real-time digital computer where the majority of the computation involved the discontinuous, programmed solution of the trigonometric relationships of navigation equations and a high solution rate for the trigonometric relationships of coordinate transformation. The basic computing technique in CORDIC is a step-by-step sequence of pseudo rotations which result in an over-all rotation through a given angle or result in a final angular argument of zero. The CORDIC computing technique and variations thereof have been applied in many signal processing applications to find an approximate magnitude of a complex number by means of a process of successive rotations of its representative vector towards one of the real or imaginary component axes. Some drawbacks of CORDIC for magnitude approximation are: complexity of implementation, "growth" or multiplication by a factor related to the number of iterations, and time required for enough iterations to obtain acceptable accuracy.

A second method, widely used in radar signal processing, is single-interval linear approximation. Here, the real and imaginary components, X and Y are compared and the greater one is multiplied by a factor $K_G$ and added to a factor $K_L$ multiplied by the lesser one. When no actual multiplier is available, $K_G$ is unity and $K_L$ is chosen as $\frac{1}{4}$, $\frac{3}{8}$, or $\frac{1}{2}$ to allow implementation with adders. Drawbacks include a need for comparison and multiplexing between X and Y, and poor accuracy of about 3% RMS error (over all angles) and greater than 10% peak error A third method as shown in a patent to William M. Vojir et al, U.S. Pat. No. 4,599,701 describes a complex magnitude computing circuit that implements piecewise linear approximations to achieve high precision without the need for iteration and its processing burden. It is a generalization of the second method to multiple intervals wherein the greater (multiplied by a constant) and lesser components are further compared to determine which of two or more sets of constants $K_G$ and $K_L$ should be used in the multiplications. The increased accuracy, compared with the second method, is at the expense of greater complexity and time delay of the additional comparisons.

All three of these methods effectively require determination of the phase angle of the input vector to varying degrees of precision. Mechanization, even to simply determine the octant of the angle, requires a "pass the maximum to one destination and the minimum to another" function with considerable complexity of the requisite comparison and multiplexing hardware which must handle all bits of each component.

SUMMARY OF THE INVENTION

In accordance with the present invention an apparatus and method is provided for approximating the magnitude of a vector represented by a complex number having a real component X and an imaginary component Y. The apparatus comprises means for generating a logarithm of an absolute value of the real component X and a logarithm of an absolute value of the imaginary component Y, means coupled to the logarithm generating means for selecting a scaling constant pair in accordance with an address formed by concatenating the logarithm of the absolute value of the real component X and the logarithm of the absolute value of the imaginary component Y, the constant pair comprising a real constant $K_x$ and an imaginary constant $K_y$, and means coupled to the constant pair selecting means, to the real component X and to the imaginary component Y for computing the magnitude of the complex number. The logarithm is computed to the base-2, and the real component X and the imaginary component Y of the complex number is represented by two's complement binary words. A constant pair is preselected for each one of a plurality of regions within a quadrant of a coordinate system representing a complex plane, and the preselected set of constant pairs for the quadrant is applicable to all quadrants in accordance with a sign of the real component X and the imaginary component Y. The set of constant pairs for a quadrant are selected to minimize the root mean square (RMS) error over all values of the real component X and the imaginary component Y. This apparatus provides a noniterative algorithm with no feedback required, and it is amenable to pipelined implementation with throughput up to one approximation performed per clock cycle in a fully parallel implementation. The real and imaginary channels remain independent through a greater portion of the hardware than in another approach requiring the computation of the maximum of the real and imaginary components, while no multiplexing of the components is required. An accuracy of 0.57% RMS error (of the value) is achieved with the present invention. Accuracy may be significantly improved by generating the logarithms with more bits and employing more sets of constant pairs.

In accordance with a further feature of the invention, a method is provided for approximating the magnitude of a complex number having a real component X and an imaginary component Y comprising the steps of: generating a base-2 logarithm of an absolute value of the real component X of the complex number, generating a base-2 logarithm of an absolute value of the imaginary component Y of the complex number, selecting a code in accordance with an address formed from the logarithm of an absolute value of the real component X and the logarithm of an absolute value of the imaginary component Y, the code being used to select one of a plurality of constant pairs for each one of a plurality of regions in a quadrant of a coordinate system storing the plurality of constant pairs for the plurality of regions in a memory means, the memory means having a first portion for storing real constants $K_x$ of the constant pairs and a second portion for storing imaginary constants $K_y$ of the constant pairs, multiplying the real component X by the real constant $K_x$ from the first portion of the memory means to obtain a real product term, multiplying the imaginary component Y by the imaginary constant $K_y$ from the second portion of the memory means to obtain an imaginary product term, and adding the real product term to the imaginary product term to obtain the magnitude of the complex number. The steps of generating the logarithm of an absolute value of the real component X and the logarithm of an absolute value of the imaginary component Y further comprise generating logarithms symmetrical about zero for positive and negative values of each component. The step of selecting the code for selecting one of a plurality of constant pairs further comprises the step of using the one quadrant of constant pairs for all quadrants of the coordinate system in accordance with a sign of the real component X and a sign of the imaginary component Y with the coordinate system representing a complex plane. The step of selecting the constant pair includes having sets of a constant pair optimized to minimize root mean square (RMS) error over all possible values of the real component X and the imaginary component Y in a coordinate system representing a complex plane. The step of selecting one of a plurality of constant pairs for the plurality of regions comprises the step of providing seven sets of the constant pairs. The step of providing seven sets of the constant pairs further comprises the step of obtaining the seven sets from four sets of constant pairs by interchanging the real constant $K_x$ and the imaginary constant $K_y$ within a set in accordance with a location of each of the regions with respect to a 45 degree line in the quadrant of the coordinate system representing a complex plane.

BRIEF DESCRIPTION OF THE DRAWINGS

Other and further features of the invention will become apparent in connection with the accompanying drawings wherein.

DESCRIPTION OF THE PREFERRED EMBODIMENT

Figure 1:
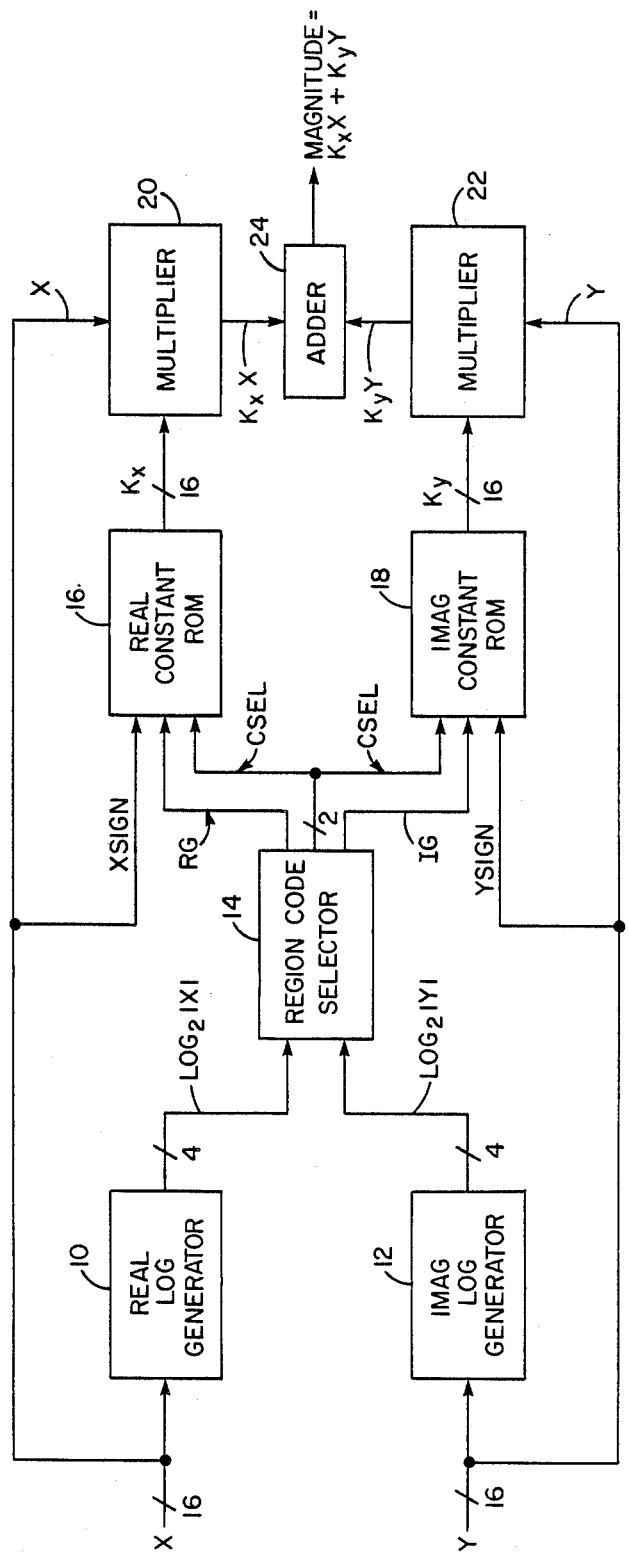
FIG. 1 is a block diagram representation of the invention for approximating the magnitude of a complex number.

Referring now to FIG. 1 there is shown a functional block diagram of the invention for approximating the vector magnitude of a complex number $X+jY$ having a real component, X, and an imaginary component, Y. An approximate magnitude, M, of the complex number $X+jY$ is obtained by the embodiment of FIG. 1 solving the equation $$M = K_x X + K_y Y$$

where $K_x$ is a real scaling constant and $K_y$ is an imaginary scaling constant. The real component X word input in two's complement representation comprising 16 bits is coupled to a Real Log Generator 10 and the imaginary component Y word input in two's complement representation comprising 16 bits is coupled to an IMAG Log Generator 12. Both Log generators 10 and 12 determine the base-2 logarithm (log) of the absolute value of the two's complement numbers applied to their inputs, and four bit outputs from each of said Log Generators 10 and 12 are concatenated and coupled to a Region Code Selector 14. The Region Code Selector 14 receives a total of 8 bits at its input for selecting and generating a 2-bit constant select (CSEL) code, in addition to generating two control signals RG and IG for indicating which of the two log values received by the Region Code Selector 14 is greater in value. The CSEL and RG signals are coupled to a Real Constant ROM 16 and the CSEL and IG signals are coupled to an IMAG Constant ROM 18. The Real Constant ROM 16 also receives a sign bit (XSIGN) of the real component X word as an input and the IMAG Constant ROM 18 also receives a sign bit (YSIGN) of the imaginary component Y word as an input. The 16 bit output, $K_x$, from the Real Constant ROM 16 is coupled to Multiplier 20 where it is multiplied by the real component X word input and the resulting product $K_x X$ is coupled to Adder 24. A 16 bit output, $K_y$, from the IMAG Constant ROM 18 is coupled to a Multiplier 22 where it is multiplied by the imaginary component Y word input and the resulting product $K_y Y$ is coupled to Adder 24. Adder 24 adds together the two products $K_x X + K_y Y$ which produces the approximate magnitude, M, of the complex number $X+jY$.

Still referring to FIG. 1, sufficient accuracy is obtained for selecting the multiplier constants $K_x$ and $K_y$ by calculating the 4-bit base-2 logarithms of the absolute values of the real and imaginary components, X and Y, of a complex number using the Real Log Generator 10 and the IMAG Log Generator 12. These logarithms are obtained by counting the number of leading zeros (for positive numbers) or the number of leading ones (for negative numbers) and the numbers are two's complement numbers. Each additional leading zero in a positive number decreases the base-2 log of the number by one and each additional leading one in a negative number decreases the base-2 log of the number by one. The Real Log Generator 10 is embodied using two programmed array logic (PAL) devices such as model AMPAL22V10A manufactured by Advanced Micro Devices of Sunnyvale, Calif. While a single programmable logic array could be used, the two PAL devices permit operation at an 8 MHz clock frequency as required in the application of the present embodiment. One of the PALs determines the logarithm for the positive numbers and the other PAL determines the logarithm for the negative numbers. Tables 1 and 2 respectively show the truth tables for these two PAL devices. One skilled in the art may recognize that secondary benefits may be derived in a signal processing system having logarithm generators by accomplishing other functions such as bit compression to reduce memory storage requirements, conversions to floating point, and overflow prediction.

The output values for Table 1 are not the true base-2 log values but instead each is the base-2 log value plus 1. This provides for the base-2 logs of positive and negative inputs to be symmetrical about zero. The 4-bit outputs of the two PALs implementing the Real Log Generator 10 are ORed together to produce the base-2 logarithm of the 16-bit real component X absolute value ($\log_2|X|$).

TABLE 1

LEADING ZERO DETECTOR
(BASE 2 LOG OUTPUT)

| INPUT BITS | | | | | | | | | | | | | | | | OUTPUTS | | | |
|---|---|---|---|---|---|---|---|---|---|---|---|---|---|---|---|---|---|---|---|
| S | 14 | 13 | 12 | 11 | 10 | 9 | 8 | 7 | 6 | 5 | 4 | 3 | 2 | 1 | 0 | 3 | 2 | 1 | 0 |
| 0 | 1 | X | X | X | X | X | X | X | X | X | X | X | X | X | X | 1 | 1 | 1 | 1 |
| 0 | 0 | 1 | X | X | X | X | X | X | X | X | X | X | X | X | X | 1 | 1 | 1 | 0 |
| 0 | 0 | 0 | 1 | X | X | X | X | X | X | X | X | X | X | X | X | 1 | 1 | 0 | 1 |
| 0 | 0 | 0 | 0 | 1 | X | X | X | X | X | X | X | X | X | X | X | 1 | 1 | 0 | 0 |
| 0 | 0 | 0 | 0 | 0 | 1 | X | X | X | X | X | X | X | X | X | X | 1 | 0 | 1 | 1 |
| 0 | 0 | 0 | 0 | 0 | 0 | 1 | X | X | X | X | X | X | X | X | X | 1 | 0 | 1 | 0 |
| 0 | 0 | 0 | 0 | 0 | 0 | 0 | 1 | X | X | X | X | X | X | X | X | 1 | 0 | 0 | 1 |
| 0 | 0 | 0 | 0 | 0 | 0 | 0 | 0 | 1 | X | X | X | X | X | X | X | 1 | 0 | 0 | 0 |
| 0 | 0 | 0 | 0 | 0 | 0 | 0 | 0 | 0 | 1 | X | X | X | X | X | X | 0 | 1 | 1 | 1 |
| 0 | 0 | 0 | 0 | 0 | 0 | 0 | 0 | 0 | 0 | 1 | X | X | X | X | X | 0 | 1 | 1 | 0 |
| 0 | 0 | 0 | 0 | 0 | 0 | 0 | 0 | 0 | 0 | 0 | 1 | X | X | X | X | 0 | 1 | 0 | 1 |
| 0 | 0 | 0 | 0 | 0 | 0 | 0 | 0 | 0 | 0 | 0 | 0 | 1 | X | X | X | 0 | 1 | 0 | 0 |
| 0 | 0 | 0 | 0 | 0 | 0 | 0 | 0 | 0 | 0 | 0 | 0 | 0 | 1 | X | X | 0 | 0 | 1 | 1 |
| 0 | 0 | 0 | 0 | 0 | 0 | 0 | 0 | 0 | 0 | 0 | 0 | 0 | 0 | 1 | X | 0 | 0 | 1 | 0 |
| 0 | 0 | 0 | 0 | 0 | 0 | 0 | 0 | 0 | 0 | 0 | 0 | 0 | 0 | 0 | 1 | 0 | 0 | 0 | 1 |
| 0 | 0 | 0 | 0 | 0 | 0 | 0 | 0 | 0 | 0 | 0 | 0 | 0 | 0 | 0 | 0 | 0 | 0 | 0 | 0 |

TABLE 2

LEADING ONE DETECTOR
(BASE 2 LOG OUTPUT)

| INPUT BITS | | | | | | | | | | | | | | | | OUTPUTS | | | |
|---|---|---|---|---|---|---|---|---|---|---|---|---|---|---|---|---|---|---|---|
| S | 14 | 13 | 12 | 11 | 10 | 9 | 8 | 7 | 6 | 5 | 4 | 3 | 2 | 1 | 0 | 3 | 2 | 1 | 0 |
| 1 | 1 | 1 | 1 | 1 | 1 | 1 | 1 | 1 | 1 | 1 | 1 | 1 | 1 | 1 | 1 | 0 | 0 | 0 | 0 |
| 1 | 1 | 1 | 1 | 1 | 1 | 1 | 1 | 1 | 1 | 1 | 1 | 1 | 1 | 1 | 0 | 0 | 0 | 0 | 1 |
| 1 | 1 | 1 | 1 | 1 | 1 | 1 | 1 | 1 | 1 | 1 | 1 | 1 | 1 | 0 | X | 0 | 0 | 1 | 0 |
| 1 | 1 | 1 | 1 | 1 | 1 | 1 | 1 | 1 | 1 | 1 | 1 | 1 | 0 | X | X | 0 | 0 | 1 | 1 |
| 1 | 1 | 1 | 1 | 1 | 1 | 1 | 1 | 1 | 1 | 1 | 1 | 0 | X | X | X | 0 | 1 | 0 | 0 |
| 1 | 1 | 1 | 1 | 1 | 1 | 1 | 1 | 1 | 1 | 1 | 0 | X | X | X | X | 0 | 1 | 0 | 1 |
| 1 | 1 | 1 | 1 | 1 | 1 | 1 | 1 | 1 | 1 | 0 | X | X | X | X | X | 0 | 1 | 1 | 0 |
| 1 | 1 | 1 | 1 | 1 | 1 | 1 | 1 | 1 | 0 | X | X | X | X | X | X | 0 | 1 | 1 | 1 |
| 1 | 1 | 1 | 1 | 1 | 1 | 1 | 1 | 0 | X | X | X | X | X | X | X | 1 | 0 | 0 | 0 |
| 1 | 1 | 1 | 1 | 1 | 1 | 1 | 0 | X | X | X | X | X | X | X | X | 1 | 0 | 0 | 1 |
| 1 | 1 | 1 | 1 | 1 | 1 | 0 | X | X | X | X | X | X | X | X | X | 1 | 0 | 1 | 0 |
| 1 | 1 | 1 | 1 | 1 | 0 | X | X | X | X | X | X | X | X | X | X | 1 | 0 | 1 | 1 |
| 1 | 1 | 1 | 1 | 0 | X | X | X | X | X | X | X | X | X | X | X | 1 | 1 | 0 | 0 |
| 1 | 1 | 1 | 0 | X | X | X | X | X | X | X | X | X | X | X | X | 1 | 1 | 0 | 1 |
| 1 | 1 | 0 | X | X | X | X | X | X | X | X | X | X | X | X | X | 1 | 1 | 1 | 0 |
| 1 | 0 | X | X | X | X | X | X | X | X | X | X | X | X | X | X | 1 | 1 | 1 | 1 |

The IMAG Log Generator 12 is implemented with an identical pair of PAL devices used to implement the Real Log Generator 10 and produces the base-2 logarithm of the 16-bit imaginary component Y absolute value ($\log_2|Y|$).

Figure 2:
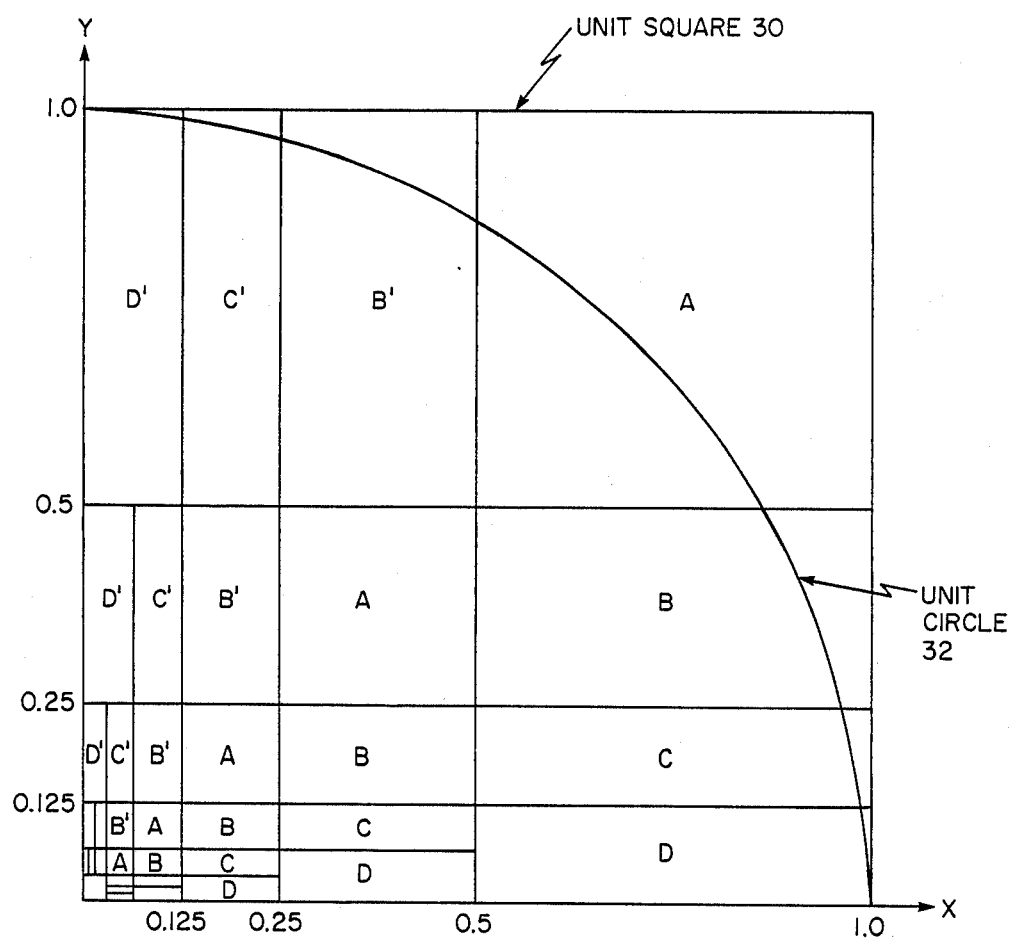
FIG. 2 shows a quadrant subdivision comprising a plurality of regions A, B, C, D, B', C' and D', each region having one of a set of seven scaling constant pairs of values for any complex number falling within that region.

Referring now to FIGS. 1 and 2, the Region Code Selector 14 generates a 2-bit constant select (CSEL) code, which is coupled to the Real Constant ROM 16 and the IMAG Constant ROM 18 and used to select one of four distinct constant pairs. Each constant pair consists of one real constant, $K_x$, and one imaginary constant, $K_y$. A constant pair is associated with each of the regions A, B, C, D, B', C' and D' of a quadrant in a coordinate system representing a complex plane as shown in FIG. 2 and the constant pair values are used for any complex number that falls within that region. Regions with the same letter (e.g., B and B') use the same constant pairs with X and Y values reversed on opposite sides of a 45° line in the complex plane. The number of regions depends on the required accuracy.

The seven sets of constants A, B, C, D, B', C' and D' in the present embodiment, listed in Table 3, were selected to minimize RMS errors to the values shown. Peak errors approaching 4.39% occur at only a few points in Region A. Area-weighted average RMS error is approximately 0.57% excluding the area outside the unit circle 32 in outer-most region A, or 0.67% over the entire unit square 30.

TABLE 3

ROM CONSTANT PAIR VALUES

| REGION | CSEL | UPPER CONSTANT | LOWER CONSTANT | RMS ERROR |
|---|---|---|---|---|
| D | 00 | .997 | .094 | 0.15% |
| C | 01 | .966 | .268 | 0.27% |
| B | 10 | .887 | .475 | 0.73% |
| A | 11 | .714 | .714 | 1.07% |

TABLE 4

CSEL as a Function of $\log_2|Y|$ and $\log_2|X|$

| | | $\log_2|X|$ | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| $\log_2|Y|$ | 0 | 11 | 10 | 01 | 00 | 00 | 00 | 00 | 00 | 00 | 00 | 00 | 00 | 00 | 00 | 00 | 00 |
| | 1 | 10 | 11 | 10 | 01 | 00 | 00 | 00 | 00 | 00 | 00 | 00 | 00 | 00 | 00 | 00 | 00 |
| | 2 | 01 | 10 | 11 | 10 | 01 | 00 | 00 | 00 | 00 | 00 | 00 | 00 | 00 | 00 | 00 | 00 |
| | 3 | 00 | 01 | 10 | 11 | 10 | 01 | 00 | 00 | 00 | 00 | 00 | 00 | 00 | 00 | 00 | 00 |
| | 4 | 00 | 00 | 01 | 10 | 11 | 10 | 01 | 00 | 00 | 00 | 00 | 00 | 00 | 00 | 00 | 00 |
| | 5 | 00 | 00 | 00 | 01 | 10 | 11 | 10 | 01 | 00 | 00 | 00 | 00 | 00 | 00 | 00 | 00 |

TABLE 4-continued

CSEL as a Function of $LOG_2|Y|$ and $LOG_2|X|$

|   | $LOG_2\|X\|$ | | | | | | | | | | | | | | | |
|---|---|---|---|---|---|---|---|---|---|---|---|---|---|---|---|---|
|   | 0 | 1 | 2 | 3 | 4 | 5 | 6 | 7 | 8 | 9 | 10 | 11 | 12 | 13 | 14 | 15 |
| 6 | 00 | 00 | 00 | 00 | 01 | 10 | 11 | 10 | 01 | 00 | 00 | 00 | 00 | 00 | 00 | 00 |
| 7 | 00 | 00 | 00 | 00 | 00 | 01 | 10 | 11 | 10 | 01 | 00 | 00 | 00 | 00 | 00 | 00 |
| 8 | 00 | 00 | 00 | 00 | 00 | 00 | 01 | 10 | 11 | 10 | 01 | 00 | 00 | 00 | 00 | 00 |
| 9 | 00 | 00 | 00 | 00 | 00 | 00 | 00 | 01 | 10 | 11 | 10 | 01 | 00 | 00 | 00 | 00 |
| 10 | 00 | 00 | 00 | 00 | 00 | 00 | 00 | 00 | 01 | 10 | 11 | 10 | 01 | 00 | 00 | 00 |
| 11 | 00 | 00 | 00 | 00 | 00 | 00 | 00 | 00 | 00 | 01 | 10 | 11 | 10 | 01 | 00 | 00 |
| 12 | 00 | 00 | 00 | 00 | 00 | 00 | 00 | 00 | 00 | 00 | 01 | 10 | 11 | 10 | 01 | 00 |
| 13 | 00 | 00 | 00 | 00 | 00 | 00 | 00 | 00 | 00 | 00 | 00 | 01 | 10 | 11 | 10 | 01 |
| 14 | 00 | 00 | 00 | 00 | 00 | 00 | 00 | 00 | 00 | 00 | 00 | 00 | 01 | 10 | 11 | 10 |
| 15 | 00 | 00 | 00 | 00 | 00 | 00 | 00 | 00 | 00 | 00 | 00 | 00 | 00 | 01 | 10 | 11 |

The Region Code Selector 14 produces the two one-bit control signals RG and IG, which are used to indicate which one of the two log values coupled to the input of the Region Code Selector 14 is the greater one.

There is a set of constant pairs for use when $\log_2|X|$ is greater than $\log_2|Y|$; *when the opposite is true, the same set is employed with the values of $K_x$ and $K_y$ reversed*. This fact permits making the contents of the Real Constant ROM 16 and IMAG Constant ROM 18 identical. The RG signal coupled to the Real Constant ROM 16 is asserted when $\log_2|X|$ is greater than $\log_2|Y|$. The IG signal coupled to the IMAG Constant ROM 18 is asserted when $\log_2|Y|$ is greater than $\log_2|X|$. When the $\log_2|X|$ equals $\log_2|Y|$, both the RG and IG signals are asserted. Table 3 shows the values of the four different constant pairs and the corresponding constant select (CSEL) code for each pair. When RG is asserted, $K_x$ is the upper constant value and $K_y$ is the lower constant value. When IG is asserted, $K_y$ is the upper constant value and $K_x$ is the lower constant value. When CSEL equals 11 both the upper and lower constants are the same; in this case the state of RG or IG is arbitrary. However, it was chosen to have both IG and RG asserted in this case to provide an indication that the Region Code Selector 14 is operating in this region. Table 4 shows how CSEL is selected by $\log_2|X|$ and $\log_2|Y|$. The Region Code Selector 14 may be embodied by a read-only memory (ROM) having 256 locations and 4 bits per location.

The Real Constant ROM 16 and the IMAG Constant ROM 18 are the lookup tables for obtaining the real constant $K_x$ and the imaginary constant $K_y$. Each table is embodied by two 32-word by 8-bit ROMs configured as one 32-word by 16-bit ROM. The inputs to each ROM 16 and 18 include the constant select (CSEL) code, the sign bit of the corresponding input word (X or Y), and the upper/lower constant bit out of the Region Code Selector 14 (RG or IG). Both the real and imaginary tables use the two-bit constant select (CSEL) code to determine which pair of constants is to be selected. In order to decide which of the 2 constants ($K_x$ or $K_y$) shall be the upper and which shall be the lower (see Table 3), the Real Constant ROM 16 uses the signal RG and the IMAG Constant ROM 18 uses the signal IG from the Region Code Selector 14. Since by definition the magnitude of a complex number is positive, the lookup tables must output the constant value with the same sign as the corresponding input by which it is to be multiplied. Therefore, the Real Constant ROM 16 has the sign bit (XSIGN) of the real input word X as an input and the IMAG Constant ROM 18 has the sign bit (YSIGN) of the imaginary input word Y as an input. This provides for four quadrant coverage with only one quadrant of specific constant pairs.

This concludes the description of the preferred embodiment. However, many modifications and alterations will be obvious to one of ordinary skill in the art without departing from the spirit and scope of the inventive concept. For example, (1) accuracy may be improved by adding more least-significant bits to the Real Log Generator 10 and IMAG Log Generator 12 outputs, the Region Code Selector 14 inputs and by extending the constant ROMs; (2) more dynamic range may be obtained with more bits in the X and Y components; (3) most of the logic structures can be further simplified and optimized for LSI implementation; (4) a tradeoff in the direction of further simplication (at the expense of throughput) may be made by employing time-sharing of log generators and multipliers or by bit-serial implementation to which the required functions are amenable; (5) pipeline registers may be employed for greater speed; and (6) binary fractional coefficient values may be used to eliminate multipliers by performing only shifting and adding. Therefore, it is intended that the scope of this invention be limited only by the appended claims.

What is claimed is:

1. Apparatus for approximating a magnitude of a complex number having a real component X and an imaginary component Y comprising:
   means for generating a logarithm of an absolute value of said real component X and a logarithm of an absolute value of said imaginary component Y of said complex number;
   means coupled to said logarithm generating means for selecting a scaling constant pair in accordance with an address formed by said logarithm of said absolute value of said real component X and said logarithm of said absolute value of said imaginary component Y, said constant pair comprising a real constant $K_x$ and an imaginary constant $K_y$; and
   means coupled to said constant pair selecting means, to said real component X, and to said imaginary component Y for computing said approximate magnitude of said complex number.

2. The apparatus recited in claim 1 wherein:
said logarithm is computed to the base-2.

3. The apparatus recited in claim 1 wherein:
said real component X and said imaginary component Y of said complex number comprise two's complement binary word inputs to said logarithm generating means.

4. The apparatus recited in claim 1 wherein:
said address for selecting a scaling constant pair is formed by concatenating said logarithm of said absolute value of said real component X and said logarithm of said absolute value of said imaginary component Y.

5. The apparatus recited in claim 1 wherein:

said logarithm generating means comprises means for generating logarithms symmetrical about zero for positive and negative inputs.

6. The apparatus recited in claim 1 wherein:
each constant pair for a quadrant of a coordinate system being applicable to all quadrants in accordance with a sign of said real component X and a sign of said imaginary component Y, said coordinate system representing a complex plane.

7. The apparatus recited in claim 1 wherein:
said constant pair is selected to obtain a desired error characteristic over all possible values of said real component X and said imaginary component Y.

8. The apparatus recited in claim 1 wherein said logarithm generating means comprises logic arrays.

9. The apparatus recited in claim 1 wherein:
said constant pair selecting means comprises logic arrays.

10. Apparatus for approximating a magnitude of a complex number having a real component X and an imaginary component Y comprising:
means for generating a logarithm of an absolute value of said real component X and a logarithm of an absolute value of said imaginary component Y of said complex number;
means coupled to said logarithm generating means for selecting a scaling constant pair in accordance with an address formed by said logarithm of said absolute value of said real component X and said logarithm of said absolute value of said imaginary component Y, said constant pair comprising a real constant $K_x$ and an imaginary constant $K_y$;
means coupled to said constant pair selecting means for multiplying said real component X by said real constant $K_x$ portion of said constant pair and said imaginary component Y by said imaginary constnat $K_y$ portion of said constant pair forming two products; and
means coupled to said multiplying means for combining said products resulting from said multiplying means to form said magnitude.

11. The apparatus recited in claim 10 wherein:
said logarithm is computed to the base-2.

12. The apparatus recited in claim 10 wherein:
said real component X and said imaginary component Y of said complex number comprise two's complement binary word inputs to said logarithm generating means.

13. The apparatus recited in claim 10 wherein:
said address for selecting a scaling constant pair is formed by concatenating said logarithm of said absolute value of said real component X and said logarithm of said absolute value of said imaginar component Y.

14. The apparatus recited in claim 10 wherein:
said logarithm generating means comprises means for generating logarithms symmetrical about zero for positive and negative inputs.

15. The apparatus recited in claim 10 wherein:
each constant pair for a quadrant of a coordinate system being applicable to all quadrants in accordance with a sign of said real component X and said imaginary component Y, said coordinate system representing a complex plane.

16. The apparatus recited in claim 10 wherein:
said combining means comprises adder means.

17. The apparatus recited in claim 10 wherein said logarithm generating means comprises logic arrays.

18. The apparatus recited in claim 10 wherein:
said constant pair selecting means comprises logic arrays.

19. Apparatus for approximating a magnitude of a complex number having a real component X and an imaginary component Y comprising:
means for generating a base-2 logarithm of an absolute value of said real component X and a base-2 logarithm of an absolute value of said imaginary component Y of said complex number;
means coupled to said logarithm generating means for selecting a code to select a constant pair for each one of a plurality of regions in a quadrant of a coordinate system;
memory means coupled to said code selecting means for storing said constant pair for each of said plurality of regions, each constant pair comprising a real constant $K_x$ and an imaginary constant $K_y$;
first multiplier means coupled to said real component X and said memory means for multiplying said real component X by said real constant $K_x$;
second multiplier means coupled to said imaginary component Y and said memory means for multiplying said imaginary component Y by said imaginary constant $K_y$; and
means coupled to an output of said first multiplier means and to an output of said second multiplier means for adding together said output from said first and second multiplier means to obtain said magnitude of a complex number.

20. The apparatus recited in claim 19 wherein:
said real component X and said imaginary component Y of said complex number comprises two's complement binary word inputs to said logarithm generating means.

21. The apparatus recited in claim 19 wherein:
values of said real component X logarithm and said imaginary component Y logarithm are concatenated to form an address for coupling to said code selecting means.

22. The apparatus recited in claim 19 wherein:
said plurality of regions comprises seven sets of said constant pairs.

23. The apparatus recited in claim 22 wherein:
said seven sets of said constant pairs are obtained by storing four sets of said constant pairs and interchanging said real constant $K_x$ and said imaginary constant $K_y$ within a set depending on a location of each of said regions with respect to a 45 degree line in a complex plane.

24. The apparatus recited in claim 19 wherein:
said constant pair is selected to minimize root means square (RMS) error over all possible values of said real component X and said imaginary component Y.

25. The apparatus recited in claim 19 wherein:
said constant pair for each of said plurality of regions stored in said memory means for said quadrant of a coordinate system being applicable to all quadrants in said coordinate system in accordance with a sign of the values of said real component X and said imaginary component Y of said complex number.

26. The apparatus recited in claim 25 wherein:
said coordinate system represents a complex plane.

27. The apparatus recited in claim 19 wherein said base-2 logarithm generating means comprises logic arrays.

28. The apparatus recited in claim 19 wherein said code selecting means comprises logic arrays.

29. A method for approximating a magnitude of a complex number having a real component X and an imaginary component Y comprising the steps of:
generating a logarithm of an absolute value of said real component X and a logarithm of an absolute value of said imaginary component Y of said complex number;
selecting a scaling constant pair in accordance with an address formed by said logarithm of said absolute value of said real component X and said logarithm of said absolute value of said imaginary component Y, said constant pair having a real constant $K_x$ portion and an imaginary constant $K_y$ portion; and
computing said approximate magnitude of said complex number in accordance with the values of said constant pair $K_x$ and $K_y$, said real component X and said imaginary component Y.

30. The method recited in claim 29 wherein:
said step of generating a logarithm comprises generating said logarithm to the base-2.

31. The method recited in claim 29 wherein:
said step of selecting a scaling constant pair further comprises the step of having stored in a memory means a plurality of constant pairs for a quadrant of a coordinate system, each of said constant pairs being applicable to at least one of a plurality of regions within said quadrant.

32. The method recited in claim 29 wherein:
said step of selecting a scaling constant pair further comprises the step of using said plurality of constant pairs for all quadrants of a coordinate system in accordance with a sign of said real component X and a sign of said imaginary component Y, said coordinate system representing a complex plane.

33. The method recited in claim 29 wherein:
said step of selecting said scaling constant pair includes having sets of a constant pair selected to minimize root means square (RMS) error over all possible values of said real component X and said imaginary component Y in a coordinate system representing a complex plane.

34. A method for approximating a magnitude of a complex number having a real component X and an imaginary component Y comprising the steps of:
generating a base-2 logarithm of an absolute value of said real component X of said complex number;
generating a base-2 logarithm of an absolute value of said imaginary component Y of said complex number;
selecting a code in accordance with an address formed from said logarithm of an absolute value of said real component X and said logarithm of an absolute value of said imaginary component Y, said code being used to select one of a plurality of constant pairs for each one of a plurality of regions in a quadrant of a coordinate system;
storing said plurality of constant pairs for said plurality of regions in a memory means, said memory means having a first portion for storing real constants $K_x$ of said constant pairs and a second portion for storing imaginary constants $K_y$ of said constant pairs;
multiplying said real component X by said real constant $K_x$ from said first portion of said memory means to obtain a real product term;
multiplying said imaginary component Y by said imaginary constant $K_y$ from said second portion of said memory means to obtain an imaginary product term; and
adding said real product term to said imaginary product term to obtain said magnitude of said complex number.

35. The method recited in claim 34 wherein:
said steps of generating said logarithm of an absolute value of said real component X and said logarithm of an absolute value of said imaginary component Y further comprises generating logarithms symmetrical about zero for positive and negative values of each component.

36. The method recited in claim 34 wherein:
said step of selecting said code for selecting one of a plurality of constant pairs further comprises the step of using said one quadrant of constant pairs for all quadrants of said coordinate system in accordance with a sign of said real component X and a sign of said imaginary component Y, said coordinate system representing a complex plane.

37. The method recited in claim 34 wherein:
said step of selecting said constant pair includes having sets of constant pairs optimized to minimize root mean square (RMS) error over all possible values of said real component X and said imaginary component Y in a coordinate system representing a complex plane.

38. The method recited in claim 34 wherein:
said step of selecting one of a plurality of constant pairs for said plurality of regions comprises the step of providing seven sets of said constant pairs.

39. The method recited in claim 38 wherein:
said step of providing seven sets of said constant pairs further comprises the step of obtaining said seven sets from four sets of constant pairs by interchanging said real constant $K_x$ and said imaginary constant $K_y$ within a set in accordance with a location of each of said regions with respect to a 45 degree line in said quadrant of said coordinate system representing a complex plane.

* * * * *